No. 855,306. PATENTED MAY 28, 1907.
J. J. HANSEL.
SLED PROPELLER.
APPLICATION FILED JAN. 18, 1906.
2 SHEETS—SHEET 1.
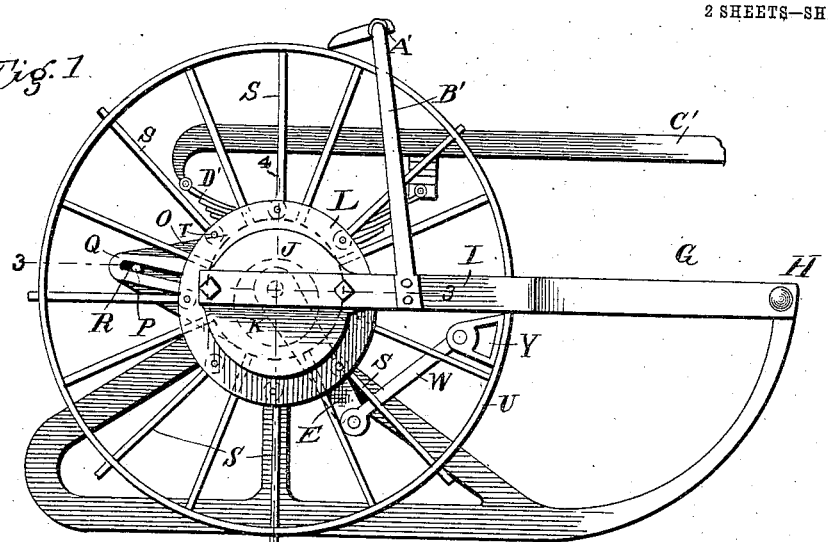
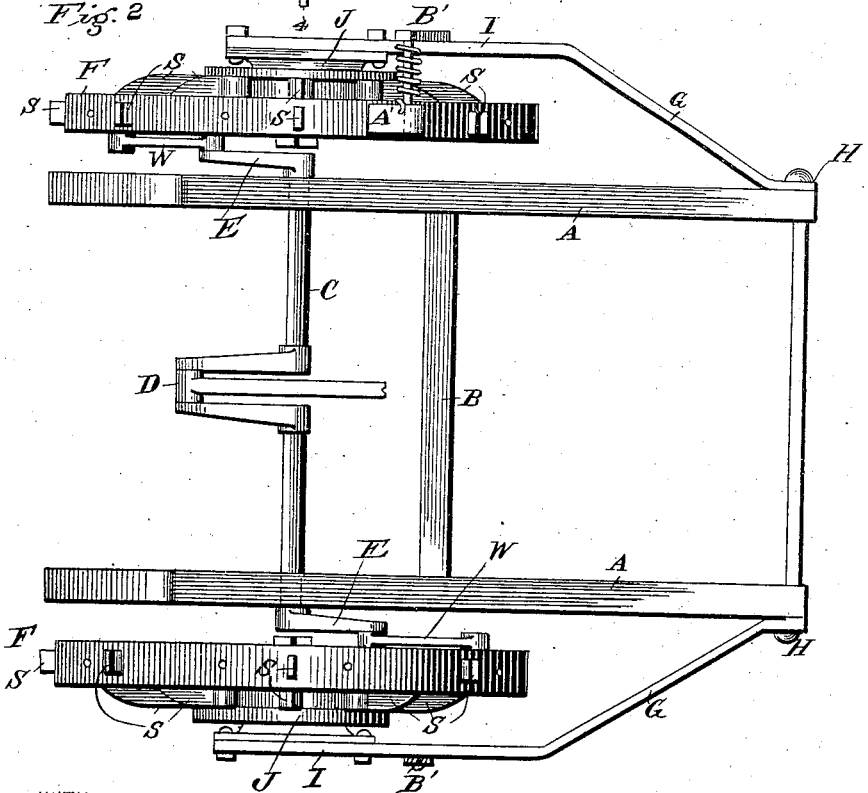
WITNESSES:
E. C. Duffey
Harrison B. Brown
INVENTOR
JOHN J. HANSEL
BY Munn & Co.
ATTORNEYS

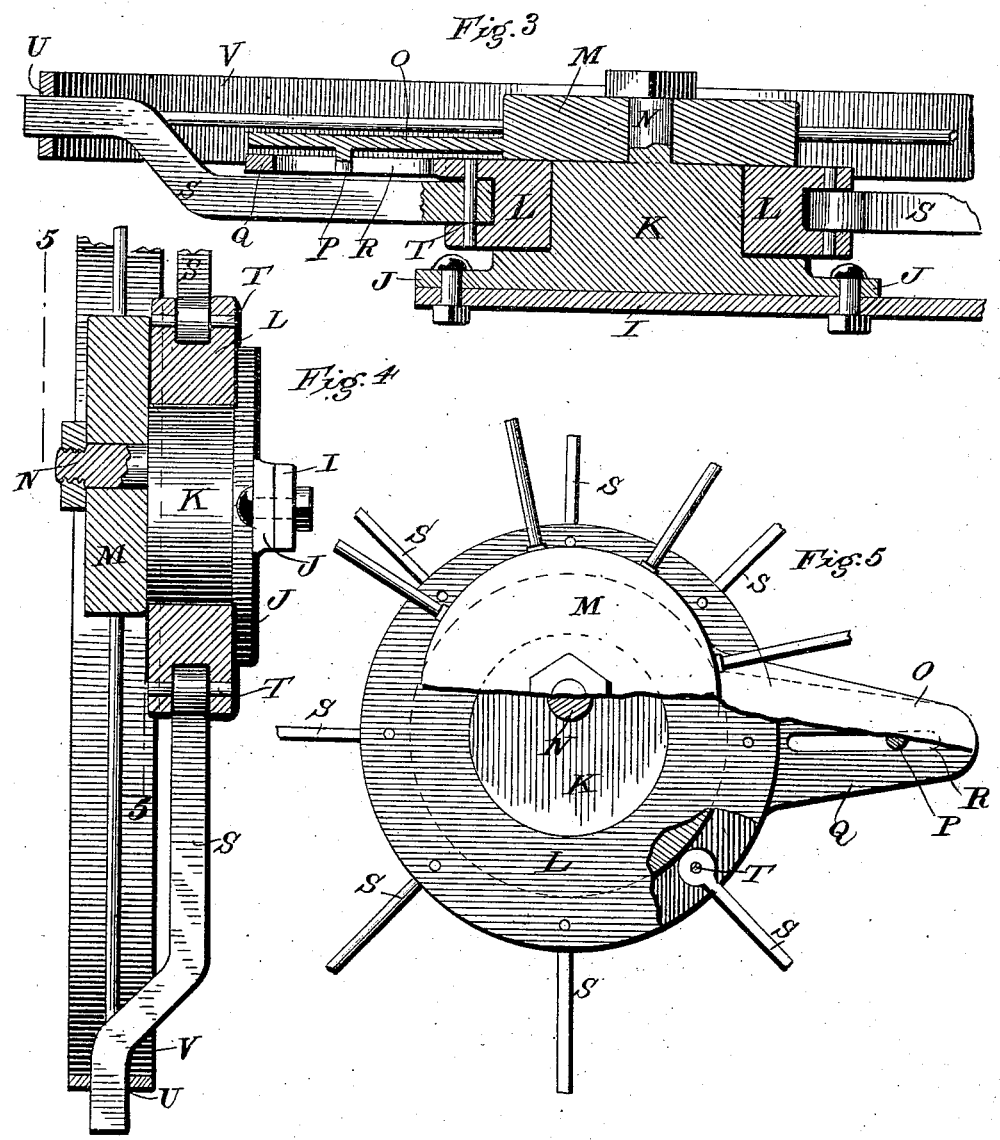

UNITED STATES PATENT OFFICE.

JOHN J. HANSEL, OF MUSKEGON, MICHIGAN.

SLED-PROPELLER.

No. 855,306.  Specification of Letters Patent.  Patented May 28, 1907.

Application filed January 18, 1906. Serial No. 296,592.

*To all whom it may concern:*

Be it known that I, JOHN J. HANSEL, a citizen of the United States, and a resident of Muskegon, in the county of Muskegon and State of Michigan, have invented a new and Improved Sled-Propeller, of which the following is a specification.

My invention relates to propelling means for sleds, designed to be driven by mechanical or manual power, and has for its object, peculiar means, adapting it for use as an attachment to automobiles, mounted on runners.

The invention consists of the special construction, arrangement and combination of parts, shown by the accompanying drawing, and hereinafter fully described, the novel features being pointed out in the claims.

In the drawings, Figure 1 is a side elevation of my improved sled propeller. Fig. 2 is a top plan view. Fig. 3 is a transverse longitudinal sectional view, taken on line 3—3 of Fig. 1. Fig. 4 is a transverse vertical sectional view, taken on line 4—4 of Fig. 1, in the view the upper portion of the propeller wheel is shown broken away, and Fig. 5 is an enlarged side elevation part in section taken on line 5—5 of Fig. 4 showing the central portion of my improved propeller wheel.

The invention may be characterized as an attachment to automobiles, employing front and rear sets of sled runners, the rear runners only, being shown by my drawing, with a suitable frame connecting the front and rear sled runner, through means of supporting springs and further, as employing peculiar propeller wheels, adapted to be driven by the automobile or other engine, or by manual means obvious to the skilled in the art.

In carrying out my invention, in its preferred form, I employ sled runners A, held bracedly apart, by suitable connecting bars B.

C denotes a power shaft, having end support in suitable bearing on the runners A, A, and provided with any mechanical means, as the crank and pitmen D, see Fig. 2, or with a sprocket or gear wheel means well understood, and not broadly claimed by me. The outer ends of the power shaft C are provided with cranks E, for the purpose hereinafter appearing.

F, F, denote like propeller wheels, one arranged on the outer side of the sled runners, see Fig. 2, and connected with the forward end of the runners, by means of oscillating arms G, G. The arms G, G, are fashioned adapting their forward ends to have pivotal support H on the runners, and with their rear ends I disposed outwardly from the runners, adapted for receiving therebetween the propeller wheels F, F, substantially as illustrated in Fig. 2.

To the free or rear end I of the arms G, I fixedly secure plates J, having inwardly disposed projections, forming journals K, upon which are rotatably arranged suitable collars L.

M denotes the hub of the wheels F, F. Upon reference to Fig. 5, it will be seen that the wheel hubs are rotatably arranged on spindles N, disposed projecting inwardly from the journals K. It will be further noticed that the spindle N is eccentrically located on the inner face of the journal K.

Referring now to Figs. 3 and 5, it will be seen that the wheel hubs are provided with arms O, having pins P extending transversely therefrom, and that the collars have similar arms Q. Longitudinally disposed slots or openings R, are provided in the arms Q, with the same adapted to receive the pin P, on the arms O.

S denote arms, having their inner ends pivotally secured to the collars L, L, by means of suitable transverse pins or bolts T, and their outer ends extending into suitable openings U through the rim V of the wheels F, F, as will be understood upon reference to the several figures of my drawing.

Referring now to Figs. 1 and 2, it will be noticed that the cranks E on the power shaft C, are connected with the wheels F, by means of links W, whose wheel ends are suitably secured to lugs Y, located on the inner side of the wheel rim V—see Fig. 1.

It is intended to employ yielding scrapers A' for both of the wheels F, the same having support on the upper ends of standards B', B', secured to the arms I.

The frame hereinbefore briefly referred to as connecting means between the front and rear runners, may be of any form adapted for the purpose, and the interposed springs referred to, be likewise of suitable construction. One form of the aforesaid frame is denoted in Fig. 1 by the reference character C' and the springs, by the reference character D'.

It will be understood that the springs are mounted upon the runners A, and secured thereto by suitable means obvious to those skilled in the art.

Since the mode of securing my propeller attachment to an automobile, sled, or other vehicle, driven by engine or manual power, will suggest itself, I have not deemed illustration of any particular means therefor necessary for a full understanding of my invention.

Having thus fully described the several features in the makeup of my sled propeller, it becomes necessary only in explaining its operation, to refer to the fact that the wheels F, F, rolling along have free up and down motion with respect to similar movement of the runners A, A, through means of their attachment to the rear or free ends of the oscillatory arms G.

Now it is apparent that when the power shaft C is set in motion, through suitable pitmen or sprocket chain connection with the power means, that the wheels F, F, will through connection of the cranks E, and links W, be revolved on the spindles N. It is further apparent that the collars L will be caused to turn on the journals K through connecting means of the wheel-arm O, and the collar-arm Q, consisting of the pin P on the former arranged projecting into the elongated slot or opening in the latter. Now the spindle N being eccentrically located on the journal K, it is obvious that when the wheels F are set in motion, and the collars L likewise driven through the described connection with the wheels, the latter will turn on one center, namely, the fixedly located spindle N, and the collars L be turned on the journals K, around a different center, namely, the center of the journal K. Now through the oscillatory support of the wheels F, provided by the arms G, as described, it is obvious that as the wheels F and collars L are turned on different centers, and the spindles N being located above the center of the journals K, see Figs. 4 and 5, that the arms S will be adjusted with their ends projected through the openings U in the rims V of the wheels, on the ground side thereof, adapted for penetrating the snow or ice, upon which the runners are moving, and that at the upper side of the wheels, the arms are adjusted drawing in their engaging ends, to substantially flush with the outer periphery of the wheels. Through operation of the arms S, as just described, they are efficiently forced into penetrating engagement with the snow or ice, and through drawing them inwardly at the upper or other portion of the wheels, above the ground line, accumulation of adhering snow or ice is wiped from the engaging ends of the arms, as they are worked in and out, through the rim-openings U, and by drawing them in substantially flush with the outer periphery of the wheel snow or ice accumulating thereon may be removed by means of a scraper, substantially as shown by my drawings and hereinbefore described.

What I claim is—

1. A sled propeller comprising an arm with its forward end pivotally secured to the sled leaving its rear end free, a wheel secured to the rear end of said arm, arms on the wheel adapted for adjustment to protruding and withdrawn position, means on the pivoted arm adapted for effecting said adjustment of the wheel arms, a rotatably supported power shaft on the sled, and means on the power shaft connecting the wheel therewith adapted for driving it, and at the same time be adapted to permit free vertical movement of the wheel.

2. A sled propeller employing an arm having its forward end pivoted to the sled, leaving its rear end free, a wheel on the free end of said arm; the wheel being adapted to roll upon the ground, a journal at the free end of said arm, a collar having support on said journal with its center to one side of the wheel center, adjustable means connecting the wheel and collar, arms extending from the collar, to and into openings through the wheel-rim, a scraper having yielding bearing on the wheel-rim, and means for rotating the wheel.

JOHN J. HANSEL.

Witnesses:
JOHN F. DOANE,
O. LE ROY DOANE.